US012726702B2

(12) United States Patent
Kubota et al.

(10) Patent No.: US 12,726,702 B2
(45) Date of Patent: Sep. 1, 2026

(54) MICROSCOPE SYSTEM, SETTING CHANGING METHOD, STORAGE MEDIUM, AND DIGITAL CAMERA

(71) Applicant: Evident Corporation, Tatsuno-machi (JP)

(72) Inventors: Akihiro Kubota, Kamiina-gun (JP); Motohiro Shibata, Kamiina-gun (JP)

(73) Assignee: Evident Corporation, Kamina-gun (JP)

(*) Notice: Subject to any disclaimer, the term of this patent is extended or adjusted under 35 U.S.C. 154(b) by 0 days.

(21) Appl. No.: 18/822,700

(22) Filed: Sep. 3, 2024

(65) Prior Publication Data

US 2025/0088743 A1 Mar. 13, 2025

(30) Foreign Application Priority Data

Sep. 8, 2023 (JP) ................................ 2023-145762

(51) Int. Cl.

| | |
|---|---|
| ***H04N 23/68*** | (2023.01) |
| ***G02B 7/00*** | (2021.01) |
| ***G02B 21/36*** | (2006.01) |
| ***G06V 10/70*** | (2022.01) |
| ***G06V 20/69*** | (2022.01) |
| ***H04N 23/61*** | (2023.01) |

(52) U.S. Cl.

CPC ......... *H04N 23/6811* (2023.01); *G02B 7/006* (2013.01); *G02B 21/367* (2013.01); *G06V 10/70* (2022.01); *G06V 20/693* (2022.01); *G06V 20/695* (2022.01); *H04N 23/61* (2023.01); *H04N 23/682* (2023.01)

(58) Field of Classification Search

CPC .. H04N 23/6811; H04N 23/61; H04N 23/682; G06V 20/695; G06V 10/70; G06V 20/693; G02B 7/006; G02B 21/367

USPC .......................................................... 348/79

See application file for complete search history.

(56) References Cited

U.S. PATENT DOCUMENTS

| | | | |
|---|---|---|---|
| 10,530,991 | B2 | 1/2020 | Wang et al. |
| 11,397,874 | B2 | 7/2022 | Yoshino |
| 12,041,340 | B2 | 7/2024 | Fabris et al. |

(Continued)

FOREIGN PATENT DOCUMENTS

| | | | |
|---|---|---|---|
| EP | 3739372 | A1 | 11/2020 |
| EP | 3574644 | B1 | 7/2023 |

(Continued)

OTHER PUBLICATIONS

Extended European Search Report (EESR) dated Feb. 27, 2025, issued in counterpart European Application No. 24198544.9.

*Primary Examiner* — Thai Q Tran
*Assistant Examiner* — Nieru Yang
(74) *Attorney, Agent, or Firm* — Holtz, Holtz & Volek PC

(57) ABSTRACT

A microscope system includes a microscope, a digital camera configured to image an object through the microscope, and a processor. The processor is configured to perform scene recognition based on an image of the object obtained by the digital camera, using a machine learning model that has learned a plurality of scenes, to perform scene determination based on a result of the scene recognition, to temporally stabilize a result of the scene determination, and to change settings of the digital camera based on the result of the scene determination.

17 Claims, 12 Drawing Sheets

(56) References Cited

U.S. PATENT DOCUMENTS

| | | | | |
|---|---|---|---|---|
| 2008/0123097 | A1* | 5/2008 | Muhammed .......... | G01J 3/0294 356/419 |
| 2017/0131536 | A1* | 5/2017 | Potocek ............... | G02B 21/365 |
| 2019/0387175 | A1* | 12/2019 | Kikuchi ............... | H04N 23/959 |
| 2021/0182610 | A1 | 6/2021 | Yoshino | |
| 2022/0076395 | A1 | 3/2022 | Amthor et al. | |

FOREIGN PATENT DOCUMENTS

| | | | |
|---|---|---|---|
| JP | 2019213130 | A | 12/2019 |
| JP | 6960445 | B2 | 11/2021 |

* cited by examiner

START

S131 SPECIFY SCENE CORRESPONDING TO HIGHEST EVALUATION

S132 IS SCENE CHANGED?

YES

NO

S133 INCREASE THRESHOLD

S134 RESET THRESHOLD

S135 MAXIMUM CUMULATIVE EVALUATION VALUE > THRESHOLD?

YES

NO

S142 IS RESTRICTION SETTING ENABLED AND ARE SETTINGS CHANGED?

YES

NO

S136 OUTPUT DETERMINATION RESULT

S137 SUSPEND DETERMINATION

END

MICROSCOPE SYSTEM, SETTING CHANGING METHOD, STORAGE MEDIUM, AND DIGITAL CAMERA

CROSS REFERENCE TO RELATED APPLICATIONS

This application is based upon and claims the benefit of priority of the prior Japanese Patent Application No. 2023-145762, filed Sep. 8, 2023, the entire contents of which are incorporated herein by reference.

BACKGROUND OF THE INVENTION

Field of the Invention

The present disclosure relates to a microscope system, a setting changing method, a storage medium, and a digital camera.

Description of the Related Art

In observation using a microscope system, optimum device settings vary depending on scenes including an observation method, an object, or a combination thereof. Therefore, a user of the microscope system needs to appropriately change device settings depending on scenes. However, it is not always easy for the user itself to perform optimum settings for scenes.

A technique related to the art is described in, for example, Japanese Patent No. 6960445. Japanese Patent No. 6960445 describes a technique of estimating (inferring) imaging intended imaging parameters of a user from a live image using artificial intelligence (learning model).

SUMMARY OF THE INVENTION

A microscope system according to one aspect of the present invention includes: a microscope; a digital camera configured to image an object through the microscope; and a processor, in which the processor is configured to perform scene recognition based on an image of the object obtained by the digital camera, using a machine learning model that has learned a plurality of scenes, to perform scene determination based on a result of the scene recognition, to temporally stabilize a result of the scene determination, and to change settings of the digital camera based on the result of the scene determination.

A setting changing method according to one aspect of the present invention causes a computer to execute the following processes including: performing scene recognition based on an image of an object obtained by a digital camera configured to image the object through a microscope, using a machine learning model that has learned a plurality of scenes; performing scene determination based on a result of the scene recognition; temporally stabilizing a result of the scene determination; and changing settings of the digital camera based on the result of the scene determination.

A computer-readable storage medium according to one aspect of the present invention stores a program causing a computer to execute the following processes including: performing scene recognition based on an image of an object obtained by a digital camera configured to image the object through a microscope, using a machine learning model that has learned a plurality of scenes; performing scene determination based on a result of the scene recognition; temporally stabilizing a result of the scene determination; and changing settings of the digital camera based on the result of the scene determination.

A digital camera according to one aspect of the present invention includes: an image sensor configured to image an object through a microscope; and a processor, in which the processor is configured to perform scene recognition based on an image of the object generated by processing an output from the image sensor, using a machine learning model that has learned a plurality of scenes, to perform scene determination based on a result of the scene recognition, to temporally stabilize a result of the scene determination, and to change settings of the digital camera based on the result of the scene determination.

DESCRIPTION OF THE EMBODIMENTS

Even when the technique described in Japanese Patent No. 6960445 is used, it is not easy to accurately perform automation of device settings corresponding to a scene. The reason for this is that images acquired with various device settings may be used as the live image used for inferring the imaging parameters such that an enormous amount of learning data and time are required to learn all the patterns in advance. This situation is likely to occur particularly in a device such as a microscope system having advanced functions and capable of performing various device settings In addition, adverse effects of the use of the learning model having a low inference accuracy are not limited to the failure of appropriate device settings for a scene. Although the same scene is imaged, the low inference accuracy of the learning model may cause hunting in the inference result. Therefore, there may be another problem in that device settings are frequently switched to hinder observation.

Figure 1:
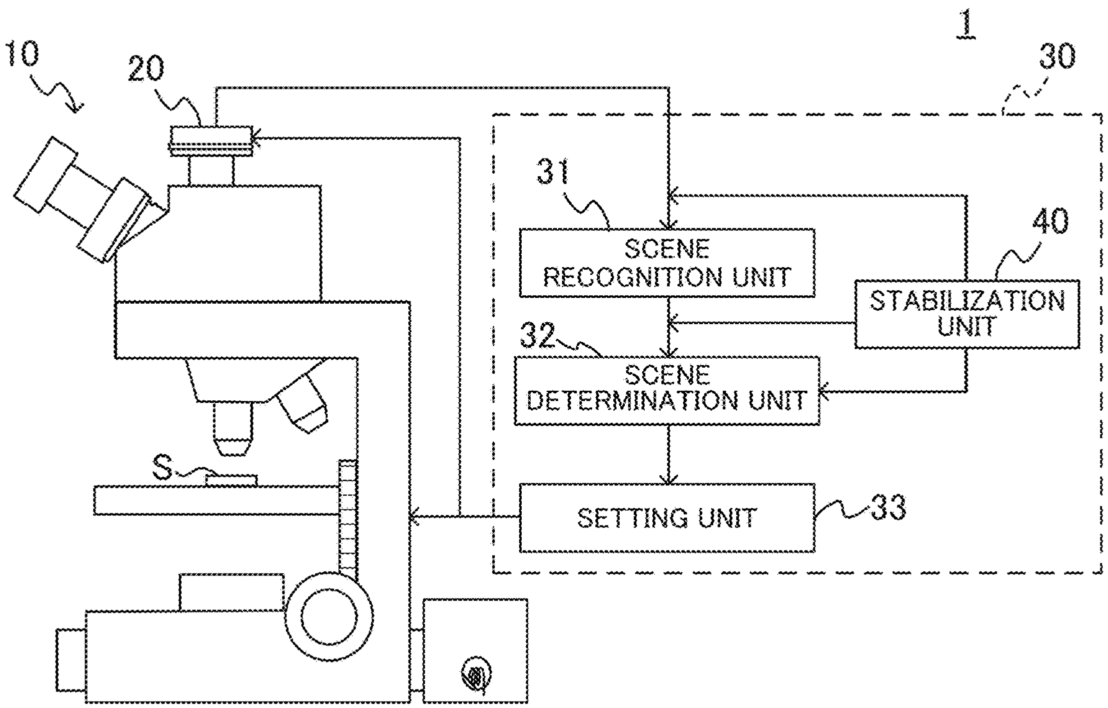
FIG. 1 is a diagram illustrating a configuration of a microscope system according to an embodiment of the present invention.

FIG. 1 is a diagram illustrating a configuration of a microscope system according to an embodiment of the present invention. A microscope system 1 illustrated in FIG. 1 includes a microscope 10, a digital camera 20 mounted on the microscope 10, and a control device 30 that controls the microscope 10 and the digital camera 20.

The microscope 10 is any microscope on which the digital camera 20 is mounted and may be, for example, a microscope capable of supporting a plurality of observation methods such as a bright field, a dark field, fluorescent observation, polarization observation, and differential interference observation.

The digital camera 20 is an example of an imaging unit of the microscope system 1. The digital camera 20 images a sample S of an object through the microscope 10 to acquire an image of the sample S. The digital camera 20 includes an image sensor, and the image sensor is, for example, a CCD or a CMOS. The image of the sample S acquired by the digital camera 20 is output to the control device 30.

In order to adjust the brightness or the color, the digital camera 20 performs a predetermined image processing on the image of the sample S, and outputs the processed image to the control device 30. The image processing that is performed by the digital camera 20 is not particularly limited, and examples thereof include white balance correction, color matrix correction, and gamma correction.

The control device 30 changes settings of the microscope system 1 based on the image acquired by the digital camera 20. As a configuration related to the setting change, the control device 30 includes a scene recognition unit 31, a scene determination unit 32, a setting unit 33, and a stabilization unit 40 as illustrated in FIG. 1.

The scene recognition unit 31 performs scene recognition using a machine learning model that has learned a plurality of scenes based on the image of the sample S obtained by the digital camera 20. The scene determination unit 32 performs scene determination based on a recognition result of the scene recognition unit 31. The setting unit 33 changes settings of the digital camera 20 based on a determination result of the scene determination unit 32. The setting unit 33 may further change settings of the microscope 10 based on the determination result of the scene determination unit 32. The stabilization unit 40 temporally stabilizes the determination result of the scene determination unit 32. The stabilization unit 40 will be described below in detail with reference to FIG. 2.

An image input to the scene recognition unit 31 is, for example, a live image (moving image) before main shooting (still image shooting) that is performed during observation in the microscope system 1. The scene recognition unit 31 recognizes, for example, a scene in each of frames of the input live image.

The scenes recognized in the scene recognition unit 31 relate to, for example, the types of the sample S, the observation methods, or combinations thereof. However, the scenes are not necessarily limited to the object and the observation methods as long as they have a relatively strong correlation with the settings of the microscope system 1.

Specifically, the machine learning model used in the scene recognition unit 31 is, for example, a machine learning model that has learned the scenes such as the types of the sample S, the observation methods, or combinations thereof by deep learning, and estimates the type of the sample S, the observation method, a combination thereof, or the like, that is, the scene. More specifically, as the machine learning model used in the scene recognition unit 31, an object detection algorithm such as YOLO (You Only Look Once) is used. An output from the scene recognition unit 31, that is, the recognition result of the scene recognition unit 31 is, for example, the sum of reliabilities of one or more bounding boxes detected in the image for each of classes (hereinafter, abbreviated as a total reliability). That is, the output from the scene recognition unit 31 includes the total reliabilities of the same number as the number of classes. Note that the classes classified by the machine learning model correspond to the scenes, respectively.

The scene determination in the scene determination unit 32 is performed by comparing the recognition result of the scene recognition unit 31 (or a cumulative recognition result described below) to a threshold. As long as the total reliability (or a cumulative total reliability described below) is the threshold or more, a value where the recognition result (or the cumulative recognition result described below) in the scene recognition unit 31 is considered to be sufficiently reliable is set as an initial value of the threshold in advance. In addition, when the total reliability (or the cumulative total reliability described below) is less than the threshold, the scene determination unit 32 is configured to suspend the scene determination. As a result, the scene determination can be performed with accuracy that is higher than or equal to that of the scene recognition in the single scene recognition unit 31.

The control device 30 stores a parameter list corresponding to optimum settings for each of the scenes in advance. The setting unit 33 reads a parameter list corresponding to the scene determined in the scene determination unit 32, and sets the digital camera 20 and the microscope 10. An example of the settings of the digital camera 20 performed by the setting unit 33 is not particularly limited and is, for example, a setting for the exposure time. In addition, an example of the settings of the microscope 10 performed by the setting unit 33 is not particularly limited and is, for example, insertion and removal of an optical element (for example, a polarizer or an analyzer) depending on an observation method.

This way, the control device 30 includes the scene recognition unit 31 and the scene determination unit 32, and thus the scene determination can be performed with accuracy that is higher than or equal to that of the single machine learning model used for the scene recognition. Therefore, optimum settings for the scene can be automatically performed on the microscope system 1. Further, the control device 30 includes the stabilization unit 40 that temporally stabilizes the determination result. Thus, the scene determination accuracy can be further improved, and hunting can be also suppressed. As a result, adverse effects of a frequent setting change on observation are also avoidable.

Figure 2:
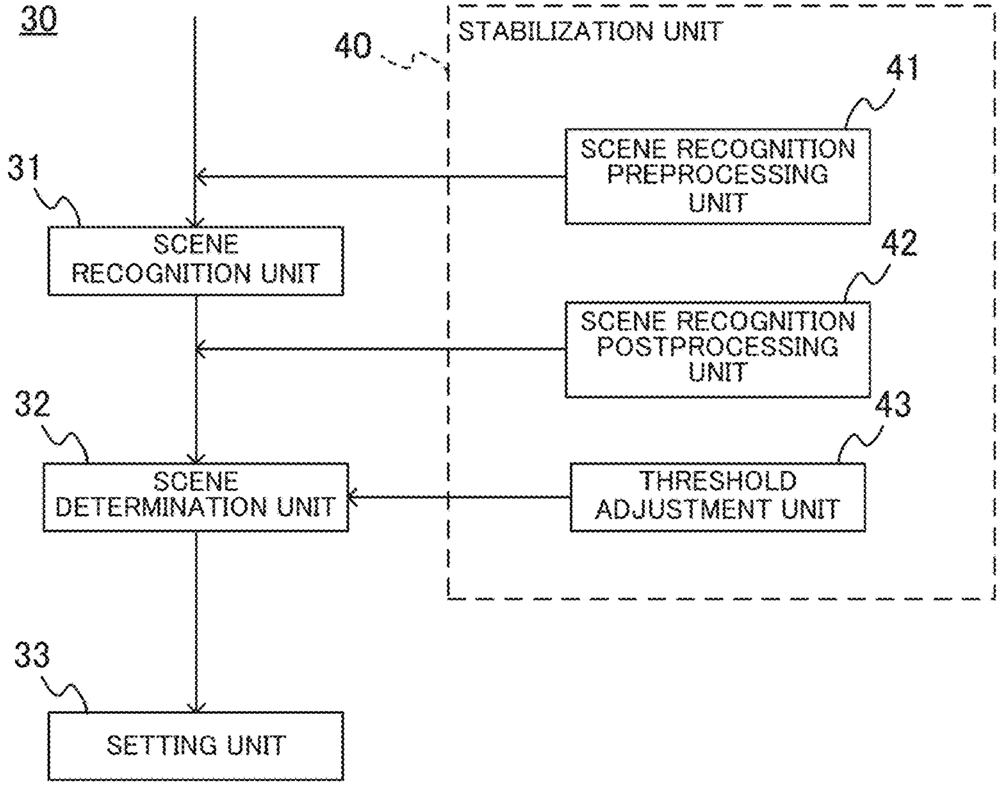
FIG. 2 is a diagram illustrating a configuration of a stabilization unit according to an embodiment of the present invention.

FIG. 2 is a diagram illustrating a configuration of a stabilization unit according to an embodiment of the present invention. Hereinafter, referring to FIG. 2, the setting change process performed by the control device 30 will be described in more detail focusing on the stabilization unit 40.

As illustrated in FIG. 2, the stabilization unit 40 includes a scene recognition preprocessing unit 41 that performs preprocessing on the image obtained in the digital camera 20, a scene recognition postprocessing unit 42 that performs postprocessing on the recognition result of the scene recognition unit 31, and a threshold adjustment unit 43 that adjusts the threshold used in the scene determination unit 32.

The scene recognition preprocessing unit 41 is configured to perform inverse transformation of image processing performed in the digital camera 20 on the image. The image processing is performed in the digital camera 20 for various purposes, for example, to prevent blown out highlights, to improve color reproducibility, and to reproduce natural appearance as if the object was seen by human eyes. The image processing has a relatively large effect on the image and depends on the device itself or device settings that are not necessarily optimized. Therefore, the predictability at the time of learning is low, and it is also not easy to learn the effect in advance. Therefore, when an image acquired by the device or an image acquired by the device with the current settings is not sufficiently learned, the recognition accuracy of the scene recognition unit 31 may decrease. The scene recognition preprocessing unit 41 is provided in consideration of this point.

By performing the inverse transformation of the image processing performed in the digital camera 20, the scene recognition preprocessing unit 41 can cancel the effect of the image processing performed in the digital camera 20. The content of the image processing performed in the digital camera 20 can be specified from identification information of the digital camera 20, the settings of the digital camera 20, and the like. The scene recognition unit 31 performs the scene recognition based on an image (hereinafter, referred to as an inverse-transformed image) obtained by the inverse transformation in the scene recognition preprocessing unit 41 such that a decrease in the recognition accuracy of the machine learning model caused by the image processing performed in the digital camera 20 can be suppressed.

In the above description, the inverse transformation is performed during the inference that is performed using the machine learning model learned by the scene recognition unit 31. However, even during the learning of the machine learning model used in the scene recognition unit 31, it is desirable to perform the inverse transformation of the image processing performed in the digital camera where the image for learning is acquired. However, as data for learning, not only the image for learning (the processed image) but also the information (settings and the like) of the digital camera during the image acquisition are not necessarily provided. Therefore, for the learning of the machine learning model, the image obtained by performing the inverse transformation of the image processing performed in the digital camera may be used as the image for learning, the image obtained by performing the image processing in the digital camera without performing the inverse transformation or the image output digital camera itself may be used as the image for learning as it is, or both of the images may be used as the image for learning.

As described above, the scene recognition preprocessing unit 41 performs preprocessing before the recognition process performed in the scene recognition unit 31 such that the recognition result (scene recognition result) of the scene recognition unit 31 itself is improved. On the other hand, the scene recognition postprocessing unit 42 performs postprocessing after the recognition process performed in the scene recognition unit 31 such that not only the recognition result (scene recognition result) of the scene recognition unit 31 but also the determination result (scene determination result) based on the recognition result are improved.

The scene recognition postprocessing unit 42 is configured to calculate an accumulated recognition result (hereinafter referred to as a cumulative recognition result) in a period corresponding to a plurality of frames based on a plurality of recognition results of the scene recognition unit 31 corresponding to the plurality of frames. The scene recognition result may temporally vary in live shooting where the image changes from hour to hour depending on a change in the motion of the sample S or environment (for example, focusing or illumination). The scene recognition postprocessing unit 42 is provided in consideration of this point.

For example, by integrating the total reliabilities for each of the classes over the plurality of frames to calculate the cumulative total reliability for each of the classes, the scene recognition postprocessing unit 42 calculates the cumulative recognition result based on the recognition results corresponding to the plurality of frames and outputs the cumulative recognition result to the scene determination unit 32. That is, the cumulative recognition result includes the cumulative total reliability for each of the classes. As a result, erroneous recognition results generated by irregularity can be avoided from being immediately reflected on the settings of the microscope system 1. In addition, the recognition results of the frames are averaged by the accumulation process. Therefore, the scene determination unit 32 performs the scene determination based on the cumulative recognition result calculated in the scene recognition postprocessing unit 42 such that the effect of deviation of the scene recognition occurring during live shooting can be suppressed, and the determination result can be temporally stabilized.

The number of frames on which the accumulation process is performed in the scene recognition postprocessing unit 42 is not particularly limited and may be determined in advance. For example, the settings may be updated by performing the scene determination based on the cumulative recognition result corresponding to five frames. In addition, the setting change based on the determination result may be performed by performing the scene determination when the cumulative recognition result satisfies a predetermined condition without determining the number of frames in advance.

The scene recognition postprocessing unit 42 may be configured to set, as a dead band, a predetermined number of frame periods (for example, periods corresponding to five frames) from a timing at which the settings are changed by the setting unit 33, and not to reflect recognition results of the scene recognition unit 31 corresponding to frames in the dead band on the cumulative recognition result. In addition, irrespective of whether the settings are changed, the scene recognition postprocessing unit 42 may set, as a dead band, a predetermined number of frame periods from a timing at which the settings are scheduled to be changed (for example, every five frames). The scene recognition postprocessing unit 42 sets the dead band such that a recognition result of a scene acquired in a state where the microscope system 1 is unstable is not reflected on the determination of the scene. Therefore, the determination result can be temporally stabilized.

As described above, the scene recognition preprocessing unit 41 and the scene recognition postprocessing unit 42 directly or indirectly improve the cumulative recognition result of the scene to improve the scene determination result. On the other hand, the threshold adjustment unit 43 adjusts the threshold that is compared to the cumulative recognition result to improve the scene determination result.

When a scene corresponding to a highest evaluation in the cumulative recognition result is different from a scene corresponding to a determination result that is just output, the threshold adjustment unit 43 is configured to increase the threshold. In addition, when the scene corresponding to the highest evaluation in the cumulative recognition result is the same as the scene corresponding to the determination result that is just output, the threshold adjustment unit 43 is configured to reset the threshold to the initial value. As a result, when it is determined that the scene is changed, the determination is performed based on more severe standards than those when it is determined that the scene is not changed. In circumstances where erroneous scene determination is likely to occur, the cumulative recognition result is not likely to increase as compared to when the scene determination is generally appropriately performed. Therefore, by increasing the threshold to perform the determination, erroneous determination can be avoided in advance. In addition, in the above-described configuration, when the scene is continuously changed, the threshold increases more and more. Therefore, the occurrence of hunting can be effectively suppressed. Further, when it is determined that the scene is not changed, the threshold is reset to the initial value to perform the determination, it is possible to avoid a situation that the determination is suspended more than necessary due to an increase in the threshold for the maintenance determination of the scene for avoiding erroneous scene determination.

Further, when the movement of the sample S is detected, the threshold adjustment unit 43 may be configured to reset the threshold to the initial value irrespective of whether the scene corresponding to the highest evaluation in the cumulative recognition result is the same as the scene corresponding to the determination result that is just output. When the movement of the sample S is detected, the possibility of occurrence of a change of the scene such as replacement of the sample S or a change in the observation method is higher than usual. Therefore, in this case, the threshold adjustment unit 43 resets the threshold such that the scene determination unit 32 may perform the scene determination based on the same standards as those when it is determined that the scene is not changed without excessively increasing the standards when it is determined that the scene is changed. With this configuration, it is possible to avoid the situation that the determination is suspended more than necessary.

A method of detecting the movement of the sample S is not particularly limited. The threshold adjustment unit 43 may detect the movement of the sample S based on the image, for example, may detect the movement of the sample S based on a motion vector calculated from the live image. In addition, the threshold adjustment unit 43 may detect the movement of the sample S based on an output from a sensor provided in a stage of the microscope 10. Further, the threshold adjustment unit 43 may detect the movement of the sample S based on a control signal (for example, a signal for controlling the stage) output from the control device 30 to the microscope 10.

As described above, in the microscope system 1, the scene can be accurately determined while avoiding hunting in the determination result of the scene. Accordingly, with the microscope system 1, appropriate device settings for the scene can be stably performed.

First Embodiment

Figure 3:
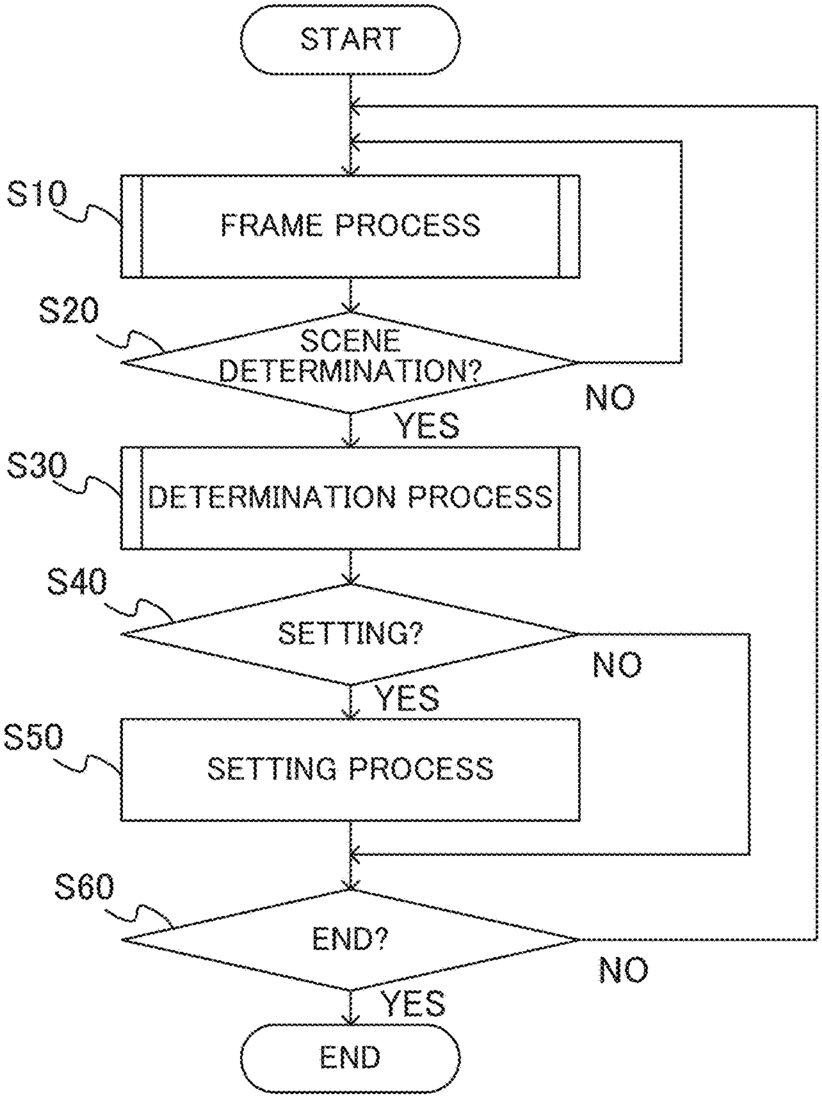
FIG. 3 is a diagram illustrating an example of a flowchart of an automatic setting process that is performed by a control device according to a first embodiment of the present invention.
Figure 4:
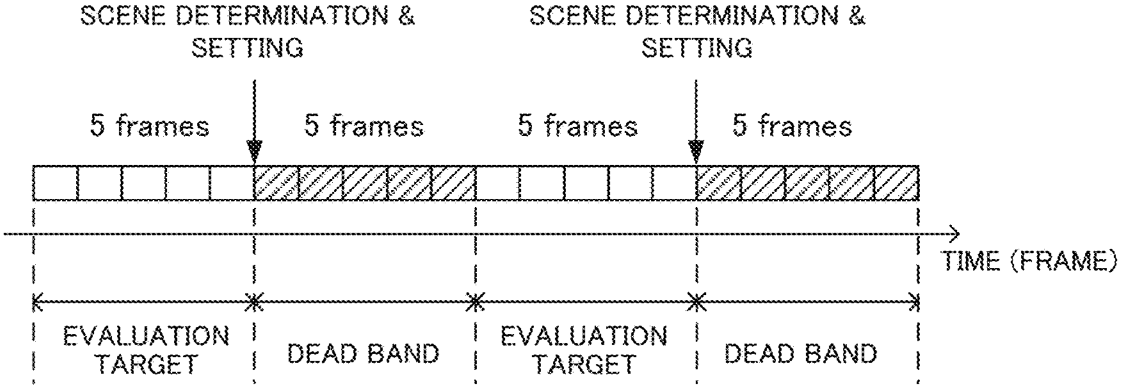
FIG. 4 is a diagram illustrating a timing at which scene determination is performed by the control device according to the first embodiment of the present invention.
Figure 5:
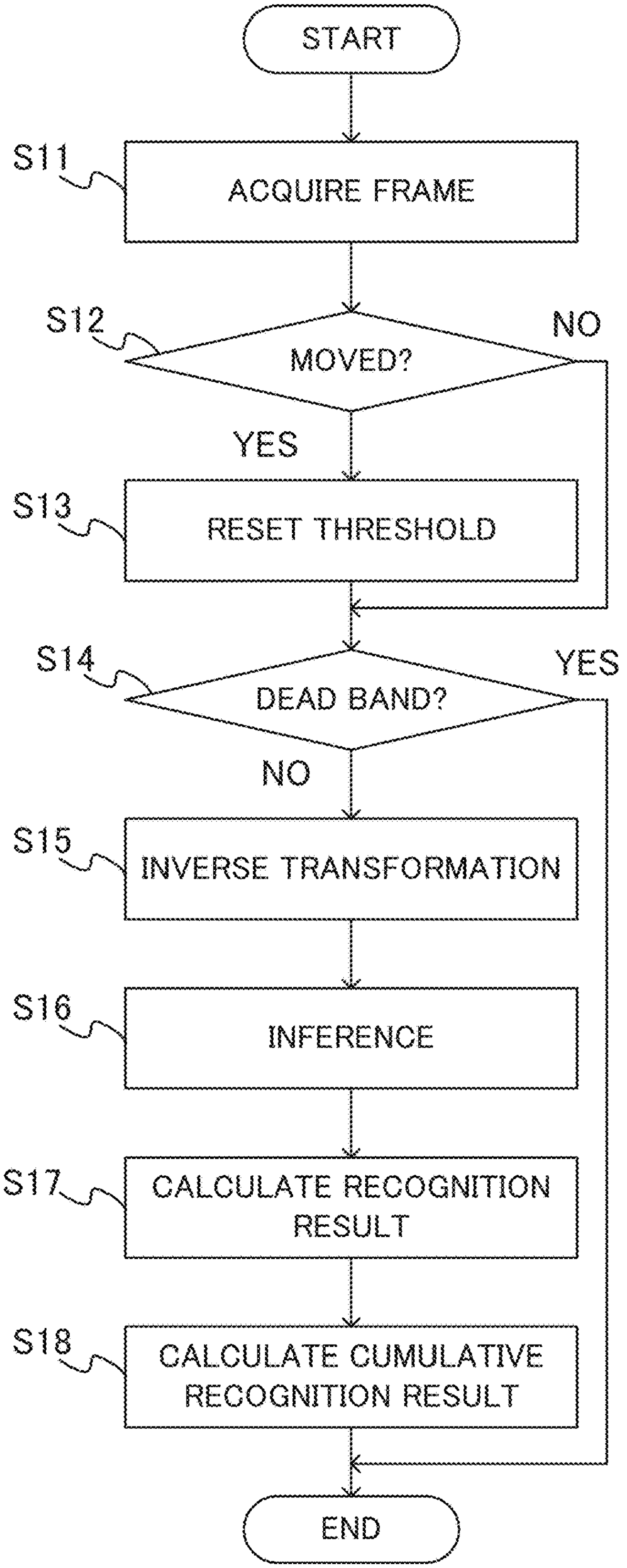
FIG. 5 is a diagram illustrating an example of a flowchart of a frame process that is performed by the control device according to the first embodiment of the present invention.
Figure 6:
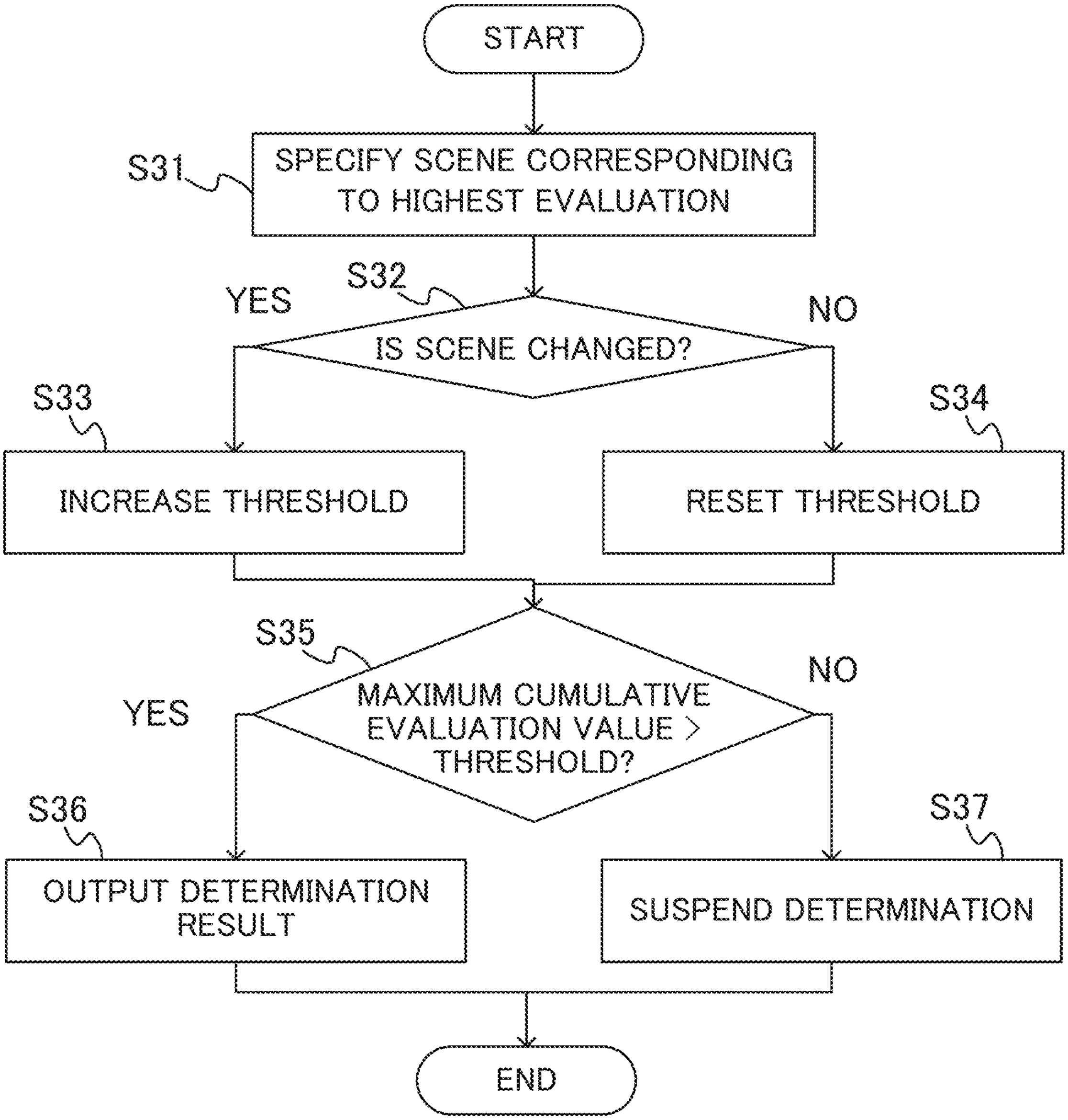
FIG. 6 is a diagram illustrating an example of a flowchart of a determination process that is performed by the control device according to the first embodiment of the present invention.

FIG. 3 is a diagram illustrating an example of a flowchart of an automatic setting process that is performed by the control device according to the present embodiment. FIG. 4 is a diagram illustrating a timing at which the scene determination is performed by the control device according to the present embodiment. FIG. 5 is a diagram illustrating an example of a flowchart of a frame process that is performed by the control device according to the present embodiment. FIG. 6 is a diagram illustrating an example of a flowchart of a determination process that is performed by the control device according to the present embodiment. Referring to FIGS. 3 to 6, the automatic setting process that is performed by the control device 30 will be described in detail. A configuration of the microscope system according to the present embodiment is the same as that of the microscope system 1. Therefore, components of the microscope system according to the present embodiment will be represented by the same reference numerals as those of the components of the microscope system 1.

When the microscope system according to the present embodiment starts live shooting, in the control device 30, a processor of the control device 30 executes a predetermined program to perform the automatic setting process illustrated in FIG. 3. Here, as illustrated in FIG. 4, five evaluation target frames and five dead band frames are set to be repeated in advance, and a case where, after the end of the five evaluation target frames, the scene determination is performed to update the settings of the microscope system 1 will be described as an example.

First, the control device 30 performs the frame process illustrated in FIG. 5 on each of the frames of the live image acquired in the digital camera 20 through the microscope 10 (Step S10).

In the frame process of Step S10, first, the control device 30 acquires an image of the latest frame in a live image (Step S11). Next, the control device 30 calculates a motion vector based on the image acquired in Step S11 and a reference image (for example, an image of the first evaluation target frame) to determine whether the sample S is moved (Step S12). When the control device 30 determines that the sample S is moved (Step S12, YES), the control device 30 resets and initializes the threshold used in the scene determination unit 32 (Step S13). When the control device 30 determines that the sample S is not moved (Step S12, NO), the control device 30 skips the process of Step S13.

Next, the control device 30 determines whether the current frame period is in the dead band (Step S14). When the control device 30 determines that the current frame period is in the dead band (Step S14, YES), the control device 30 ends the frame process illustrated in FIG. 5.

On the other hand, when the control device 30 determines that the current frame period is not in the dead band and is in an evaluation target period (Step S14, NO), the control device 30 performs inverse transformation of the image processing performed in the digital camera 20 on the image acquired in Step S11 to generate an inverse-transformed image (Step S15).

When the inverse-transformed image is generated, the control device 30 inputs the inverse-transformed image to the machine learning model to infer the scene (Step S16) and calculates an evaluation value for each of classes as a recognition result (Step S17). Specifically, the control device 30 calculates the evaluation value for each of the classes as the recognition result, the evaluation value being a total reliability obtained by adding up reliabilities for each of the classes calculated for a plurality of bounding boxes. Finally, the control device 30 integrates the evaluation value for each of the classes in the current frame calculated in Step S17 into the cumulative evaluation value for each of the classes calculated in the previous frame, calculates the updated cumulative evaluation value for each of the classes as the cumulative recognition result (Step S18), and ends the frame process illustrated in FIG. 5.

When the frame process illustrated in FIG. 5 ends, the control device 30 determines whether to perform the scene determination (Step S20). In this example, as illustrated in FIG. 5, when five evaluation target frames are continuously generated, the control device 30 determines to perform the scene determination. Accordingly, the control device 30 repeatedly performs the frame process on the five evaluation target frames and calculates a cumulative evaluation value obtained by accumulating recognition results corresponding to the five frames.

When the control device 30 determines to perform the scene determination (Step S20, YES), the control device 30 performs the determination process illustrated in FIG. 6 (Step S30).

In the determination process of Step S30, first, the control device 30 specifies a scene (class) corresponding to a highest evaluation in the cumulative recognition result (Step S31). Next, the control device 30 determines whether the scene is changed (Step S32). Here, the control device 30 determines whether the scene is changed based on whether the scene specified in Step S31 is different from a scene that is just determined in the previous determination process. When the control device 30 determines that the scene is changed, the control device 30 increases the threshold to be used in Step S35 (Step S33), and when the control device 30 determines that the scene is not changed, the control device 30 resets the threshold to be used in Step S35 to the initial value (Step S34).

Next, the control device 30 compares the cumulative evaluation value (maximum cumulative evaluation value) corresponding to the scene in the cumulative recognition result specified in Step S31 to the threshold (Step S35). When the control device 30 determines that the maximum cumulative evaluation value exceeds the threshold, the control device 30 outputs the scene corresponding to the maximum cumulative evaluation value as the determination result (Step S36), and ends the determination process illustrated in FIG. 6. On the other hand, when the control device 30 determines that the maximum cumulative evaluation value does not exceed the threshold, the control device 30 suspends the scene determination (Step S37) and ends the determination process illustrated in FIG. 6.

When the determination process illustrated in FIG. 6 ends, the control device 30 determines whether to perform the setting process (Step S40). In Step S40, when the determination result is output in the determination process of Step S30, the control device 30 performs the setting process corresponding to the determination result (Step S50). Specifically, the control device 30 reads a parameter list corresponding to the determination result (scene), and updates the settings of the digital camera 20 (for example, the setting for the exposure time) according to the parameter list. On the other hand, when the scene determination is suspended in the determination process of Step S30, the control device 30 determines not to perform the setting process (Step S40, NO), and skips the setting process of Step S50.

Finally, the control device 30 determines whether the automatic setting process illustrated in FIG. 3 ends (Step S60). For example, when an input of an end instruction from a user is detected (Step S60, YES), the control device 30 ends the automatic setting process, and when the end instruction is not detected (Step S60, NO), the control device 30 returns to Step S10 and repeats the automatic setting process.

In the microscope system according to the present embodiment, by performing the automatic setting process illustrated in FIG. 3, the scene can be accurately determined while avoiding hunting in the determination result of the scene. According, the device settings corresponding to the scene can be stably performed, and the setting operation can be automated to reduce a load on the user.

Second Embodiment

Figure 7:
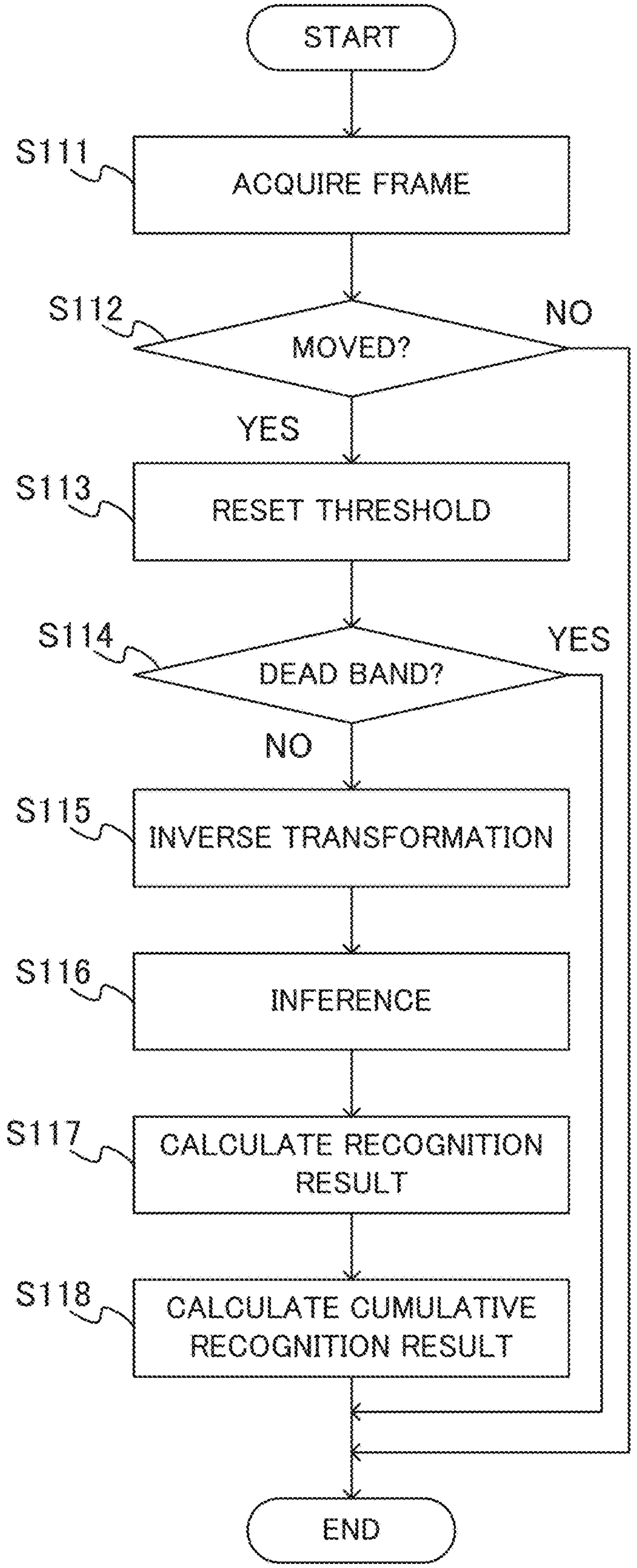
FIG. 7 is a diagram illustrating an example of a flowchart of a frame process that is performed by a control device according to a second embodiment of the present invention.

FIG. 7 is a diagram illustrating an example of a flowchart of a frame process that is performed by the control device according to the present embodiment. A configuration of the microscope system according to the present embodiment is the same as that of the microscope system 1. The automatic setting process that is performed by the control device 30 according to the present embodiment is different from the automatic setting process that is performed by the control device 30 according to the first embodiment, in that it includes the frame process illustrated in FIG. 7 instead of the frame process illustrated in FIG. 5.

The frame process illustrated in FIG. 7 includes Step S111 to Step S118 corresponding to the processes of Step S11 to Step S18 configuring the frame process illustrated in FIG. 5. The frame process illustrated in FIG. 7 is different from the frame process illustrated in FIG. 5 in that, when the control device 30 determines that the sample S is not moved in Step S112 (Step S112, NO), the control device 30 ends the frame process without performing the subsequent processes.

With the microscope system according to the present embodiment, the same effect as that of the microscope system 1 according to the first embodiment can also be obtained. Further, in the microscope system according to the present embodiment, unless the movement of the sample S is detected, the scene recognition process is not performed, and the cumulative evaluation value is also not updated. Therefore, the cumulative evaluation value does not exceed the threshold, the scene determination result is not output, and the settings are also not changed. As a result, the settings are fixed in the period where the movement of the sample S is not detected, and thus the occurrence of hunting in the determination result of the same scene can be reliably prevented.

Third Embodiment

Figure 8:
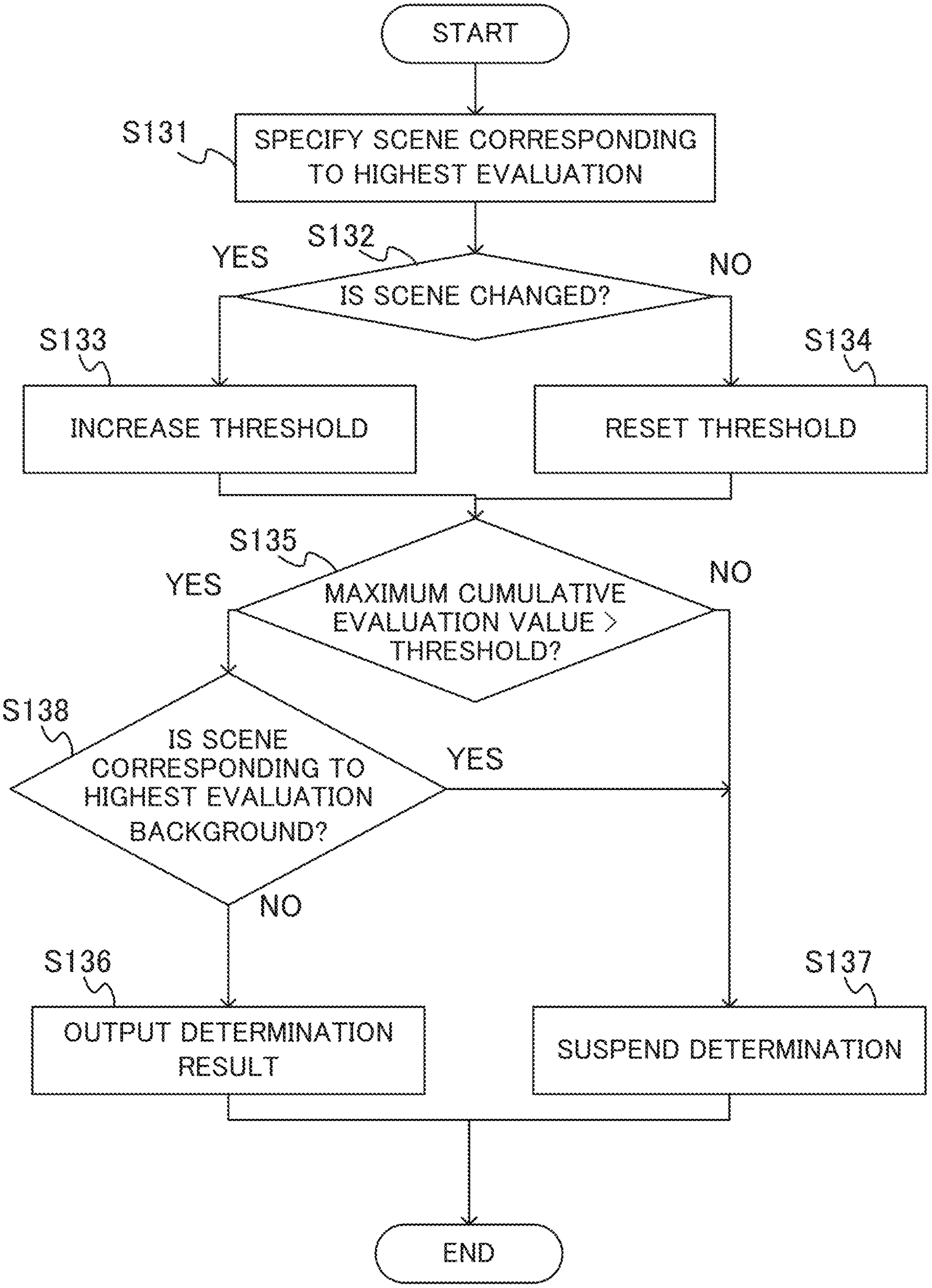
FIG. 8 is a diagram illustrating an example of a flowchart of a determination process that is performed by a control device according to a third embodiment of the present invention.

FIG. 8 is a diagram illustrating an example of a flowchart of a determination process that is performed by the control device according to the present embodiment. A configuration of the microscope system according to the present embodiment is the same as that of the microscope system 1.

The automatic setting process that is performed by the control device 30 according to the present embodiment is different from the automatic setting process that is performed by the control device 30 according to the first embodiment, in that it includes the determination process illustrated in FIG. 8 instead of the determination process illustrated in FIG. 6.

The determination process illustrated in FIG. 8 includes the process of Step S138 in addition to the processes of Step S131 to Step S137 corresponding to the processes of Step S31 to Step S37 configuring the determination process illustrated in FIG. 6. In the determination process illustrated in FIG. 8, when the control device 30 determines that the maximum cumulative evaluation value exceeds the threshold (Step S135, YES), the control device 30 determines whether the scene corresponding to the highest evaluation is a background (Step S138).

When the control device 30 determines that the scene corresponding to the highest evaluation is not a background (Step S138, NO), the control device 30 (scene determination unit 32) outputs the scene corresponding to the maximum cumulative evaluation value as the determination result (Step S136), and ends the determination process illustrated in FIG. 8. On the other hand, when the control device 30 determines that the scene corresponding to the highest evaluation is a background (Step S138, YES), the control device 30 (scene determination unit 32) suspends the scene determination (Step S137) and ends the determination process illustrated in FIG. 8 as in the case where the control device 30 determines that the maximum cumulative evaluation value does not exceed the threshold (Step S135, NO).

With the microscope system according to the present embodiment, the same effect as that of the microscope system 1 according to the first embodiment can also be obtained. Further, in the microscope system according to the present embodiment, when it is estimated from the cumulative evaluation value that the current scene is a background, the scene determination is suspended. As a result, in circumstances where it is not desired to change the settings or in circumstances where a change in the settings is meaningless, for example, when the field of view deviates from the sample S during search for a desired position of the sample S or when only the background is imaged in the process of replacing the sample S, unnecessary setting changes can be avoided.

Fourth Embodiment

Figure 9:
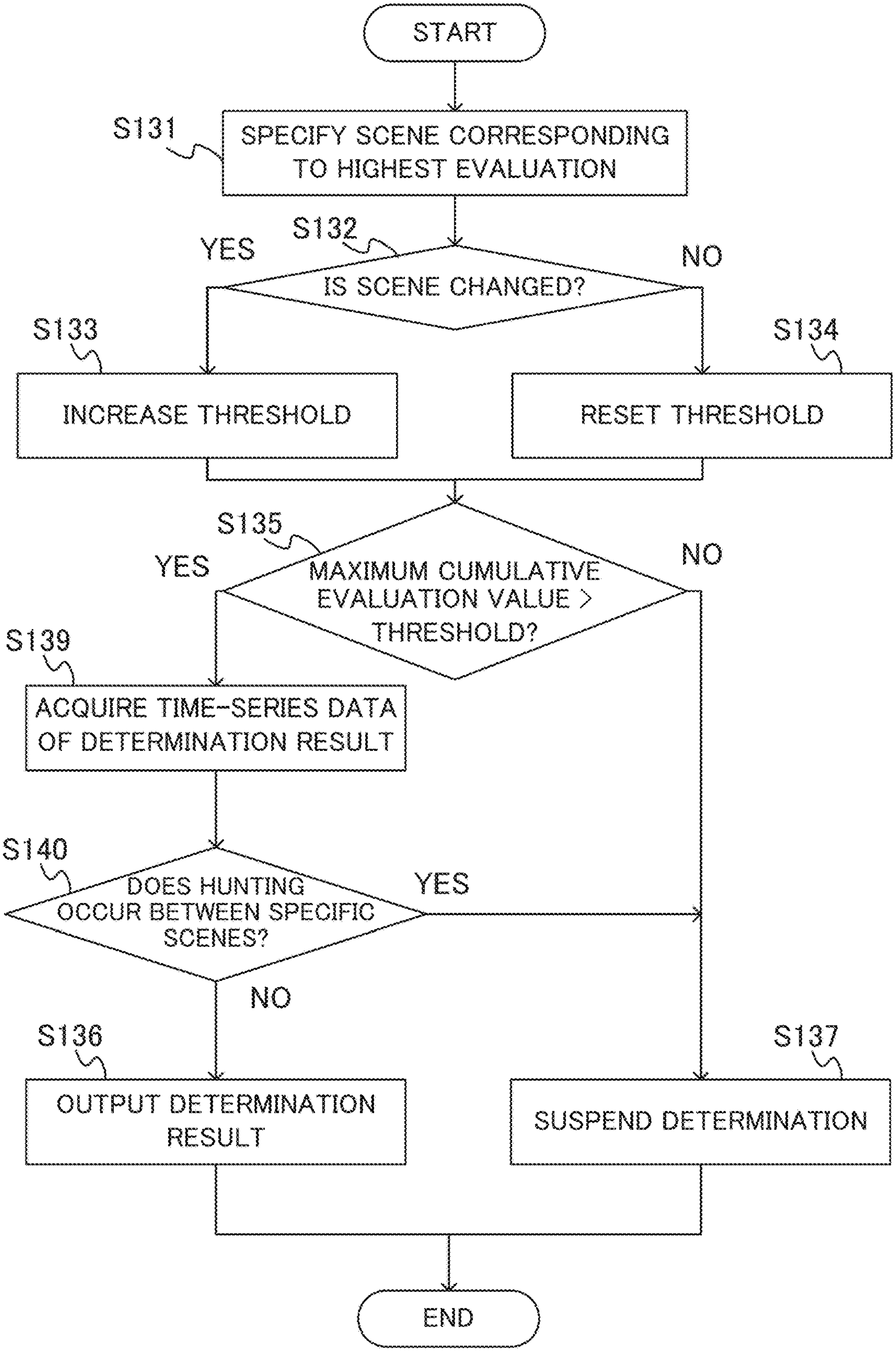
FIG. 9 is a diagram illustrating an example of a flowchart of a determination process that is performed by a control device according to a fourth embodiment of the present invention.

FIG. 9 is a diagram illustrating an example of a flowchart of a determination process that is performed by the control device according to the present embodiment. A configuration of the microscope system according to the present embodiment is the same as that of the microscope system 1. The automatic setting process that is performed by the control device 30 according to the present embodiment is different from the automatic setting process that is performed by the control device 30 according to the first embodiment, in that it includes the determination process illustrated in FIG. 9 instead of the determination process illustrated in FIG. 6.

The determination process illustrated in FIG. 9 includes the processes of Step S139 and Step S140 in addition to the processes of Step S131 to Step S137 corresponding to the processes of Step S31 to Step S37 configuring the determination process illustrated in FIG. 6. In the determination process illustrated in FIG. 9, when the control device 30 determines that the maximum cumulative evaluation value exceeds the threshold (Step S135, YES), the control device 30 further acquires time-series data of a determination result that is already output (Step S139), and determines whether hunting occurs between specific scenes (Step S140). Here, the hunting between the specific scenes refers to hunting between scenes that cannot typically occur, for example, hunting between a scene related to a biological slide sample and a scene related to an industrial printed circuit board.

When the control device 30 determines that hunting does not occur between the specific scenes (Step S140, NO), the control device 30 (scene determination unit 32) outputs the scene corresponding to the maximum cumulative evaluation value as the determination result (Step S136), and ends the determination process illustrated in FIG. 9. On the other hand, when the control device 30 determines that hunting occurs between the specific scenes (Step S140, YES), the control device 30 (scene determination unit 32) suspends the scene determination (Step S137) and ends the determination process illustrated in FIG. 9 as in the case where the control device 30 determines that the maximum cumulative evaluation value does not exceed the threshold (Step S135, NO).

That is, in the present embodiment, in the process in and after Step S135, when the evaluation value of the scene corresponding to the highest evaluation exceeds the threshold, the control device 30 determines whether to suspend the scene determination or to output the scene corresponding to the evaluation value as the determination result based on the scene corresponding to the evaluation value and the time-series data of the determination result that is already output.

With the microscope system according to the present embodiment, the same effect as that of the microscope system 1 according to the first embodiment can also be obtained. Further, in the microscope system according to the present embodiment, even if the cumulative evaluation value exceeds the threshold, when a state transition that is registered in advance and cannot occur is detected, the scene determination is suspended. As a result, for example, a setting change corresponding to the state transition that cannot occur can be avoided, and hunting caused by erroneous recognition can be prevented.

Fifth Embodiment

Figure 10:
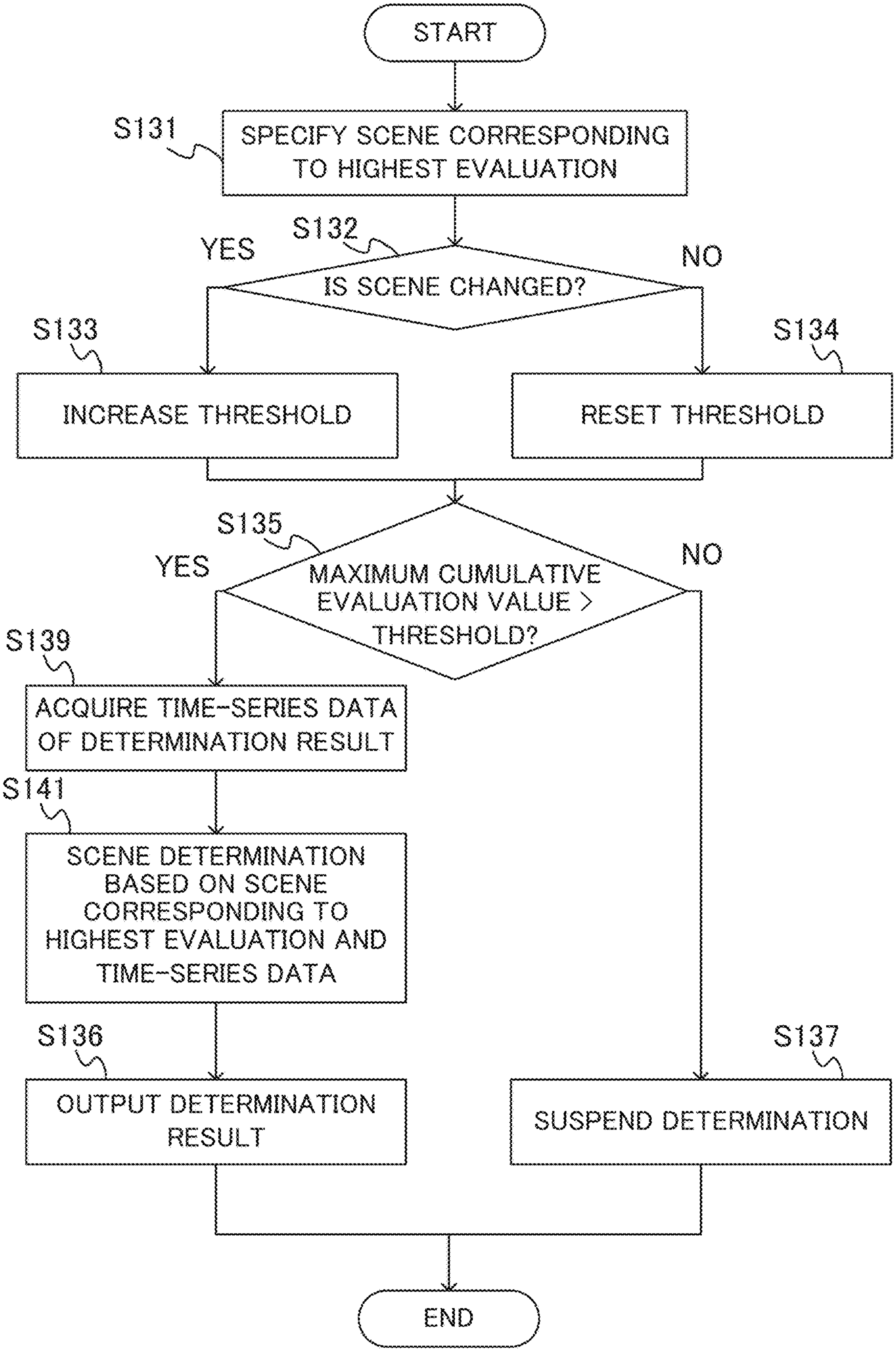
FIG. 10 is a diagram illustrating an example of a flowchart of a determination process that is performed by a control device according to a fifth embodiment of the present invention.

FIG. 10 is a diagram illustrating an example of a flowchart of a determination process that is performed by the control device according to the present embodiment. A configuration of the microscope system according to the present embodiment is the same as that of the microscope system 1. The automatic setting process that is performed by the control device 30 according to the present embodiment is different from the automatic setting process that is performed by the control device 30 according to the first embodiment, in that it includes the determination process illustrated in FIG. 10 instead of the determination process illustrated in FIG. 6.

The determination process illustrated in FIG. 10 includes the processes of Step S139 and Step S141 in addition to the processes of Step S131 to Step S137 corresponding to the processes of Step S31 to Step S37 configuring the determination process illustrated in FIG. 6. In the determination process illustrated in FIG. 10, when the control device 30 determines that the maximum cumulative evaluation value exceeds the threshold (Step S135, YES), the control device 30 further acquires time-series data of a determination result that is already output (Step S139).

Next, the control device 30 performs the scene determination based on the scene specified in Step S131 and the time-series data of the determination result acquired in Step S139 (Step S141). In addition, in Step S141, the control device 30 uses a machine learning model of RNN (Recurrent Neural Network) learned by deep learning to infer the scene based on the time-series data of the scene. Finally, the control device 30 (scene determination unit 32) outputs the scene determined in Step S141 as the determination result (Step S136), and ends the determination process illustrated in FIG. 10.

With the microscope system according to the present embodiment, the same effect as that of the microscope system 1 according to the first embodiment can also be obtained. Further, in the microscope system according to the present embodiment, the scene corresponding to the highest evaluation is not output as it is as the determination result, and the scene is determined in consideration of the time-series data. As a result, the scene determination can be performed with higher accuracy.

Sixth Embodiment

Figure 11:
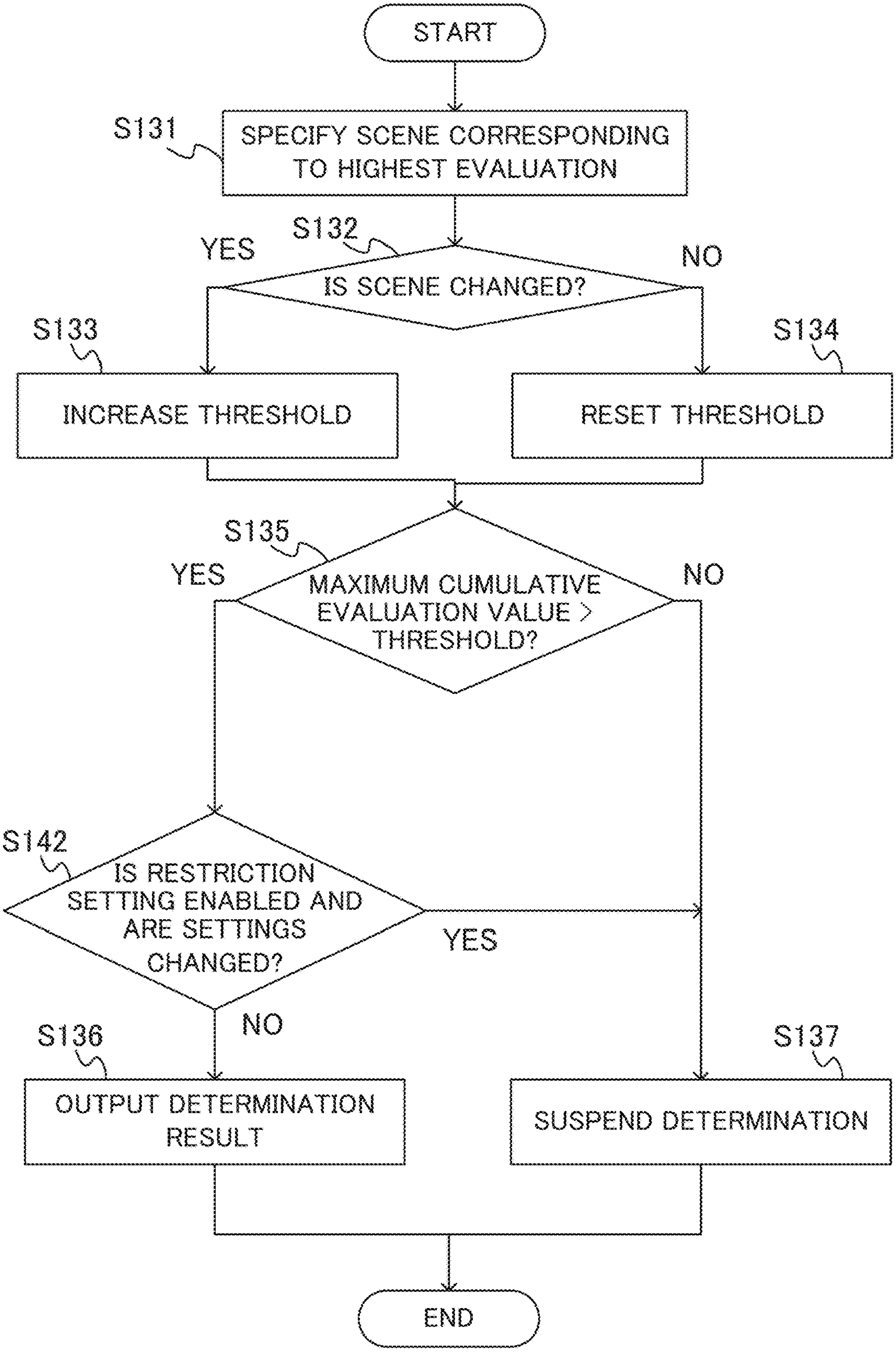
FIG. 11 is a diagram illustrating an example of a flowchart of a determination process that is performed by a control device according to a sixth embodiment of the present invention.

FIG. 11 is a diagram illustrating an example of a flowchart of a determination process that is performed by the control device according to the present embodiment. A configuration of the microscope system according to the present embodiment is the same as that of the microscope system 1. The automatic setting process that is performed by the control device 30 according to the present embodiment is different from the automatic setting process that is performed by the control device 30 according to the first embodiment, in that it includes the determination process illustrated in FIG. 11 instead of the determination process illustrated in FIG. 6.

The determination process illustrated in FIG. 11 includes the process of Step S142 in addition to the processes of Step S131 to Step S137 corresponding to the processes of Step S31 to Step S37 configuring the determination process illustrated in FIG. 6. In the determination process illustrated in FIG. 11, when the control device 30 determines that the maximum cumulative evaluation value exceeds the threshold (Step S135, YES), the control device 30 determines whether a restriction setting (one-time function) for restricting the number of times of changing the settings of the digital camera 20 to only one is enabled and the settings are already changed once (Step S142).

When the one-time function is not enabled or the settings are not already changed once (Step S142, NO), the control device 30 (scene determination unit 32) outputs the scene corresponding to the maximum cumulative evaluation value as the determination result (Step S136), and ends the determination process illustrated in FIG. 11. On the other hand, when the one-time function is enabled and the settings are already changed once (Step S142, YES), the control device 30 (scene determination unit 32) suspends the scene determination (Step S137) and ends the determination process illustrated in FIG. 11 as in the case where the control device 30 determines that the maximum cumulative evaluation value does not exceed the threshold (Step S135, NO).

With the microscope system according to the present embodiment, the same effect as that of the microscope system 1 according to the first embodiment can also be obtained. Further, in the microscope system according to the present embodiment, when the one-time function (restriction setting) is enabled, the control device 30 (setting unit 33) changes the settings of the digital camera 20 based on the determination result of the scene determination unit 32 and subsequently prohibits the settings from being changed. As a result, an excessive setting change is restricted, and thus the occurrence of hunting can be prevented.

Seventh Embodiment

Figure 12:
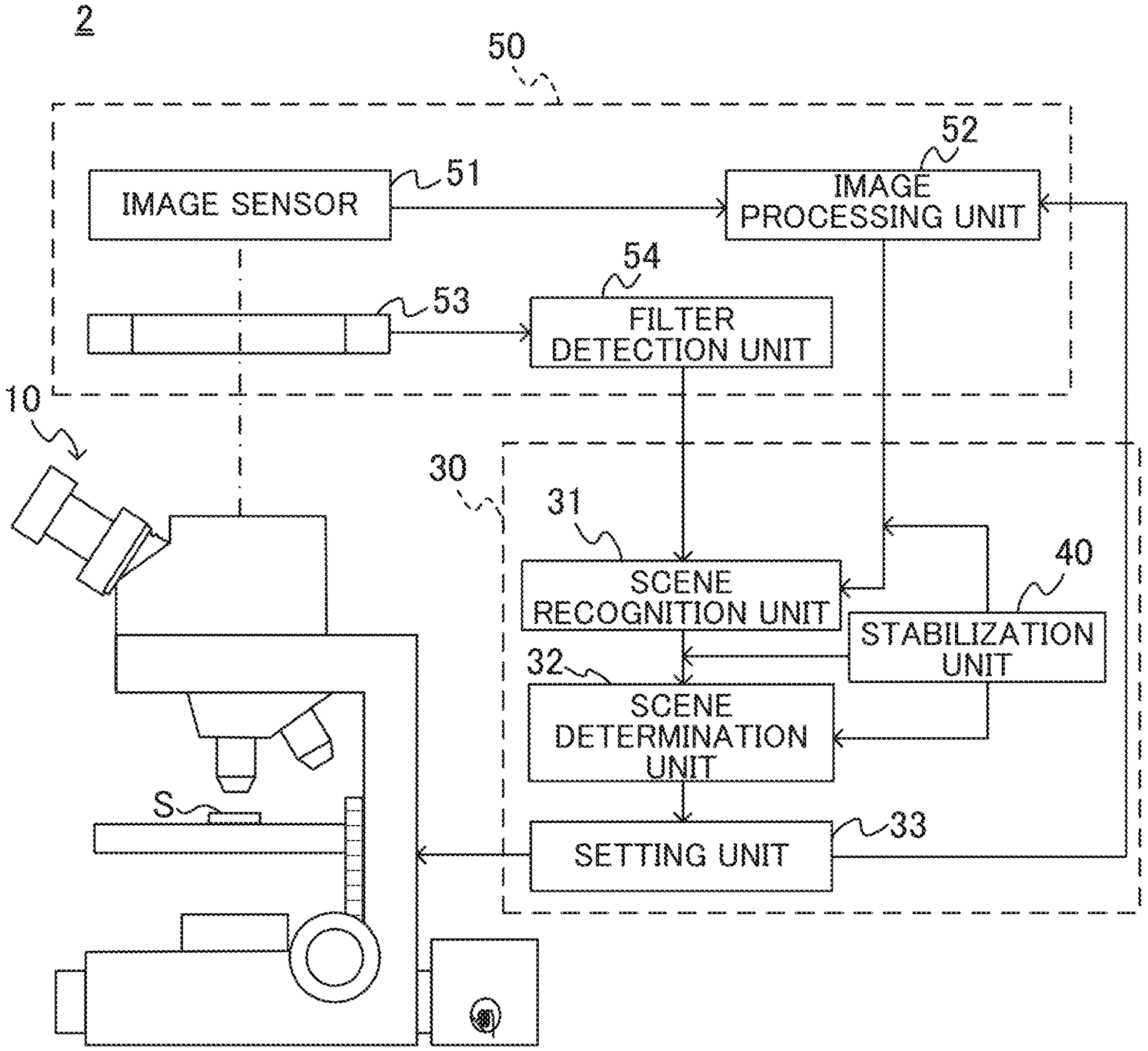
FIG. 12 is a diagram illustrating a configuration of a microscope system according to a seventh embodiment of the present invention.

FIG. 12 is a diagram illustrating a configuration of a microscope system according to the present embodiment. A microscope system 2 illustrated in FIG. 12 is different from the microscope system 1 in that it includes a digital camera 50 into or from which an infrared cut filter can be inserted or removed instead of the digital camera 20 and that the scene recognition unit 31 selectively uses the machine learning model depending on whether the infrared cut filter is inserted into the digital camera 50. The other points are similar to those of the microscope system 1.

As illustrated in FIG. 12, the digital camera 50 includes an image sensor 51 and an image processing unit 52 that processes an output from the image sensor 51 to generate an image. The digital camera 50 further includes a filter insertion-removal unit 53 that can insert or remove the infrared filter into or from an optical path between the image sensor 51 and the microscope 10 and a filter detection unit 54 that detects whether the infrared cut filter is inserted into the optical path.

In the filter insertion-removal unit 53, a mechanism that detects the insertion of the infrared cut filter is not particularly limited. In the filter insertion-removal unit 53, for example, a magnet may be provided. The filter detection unit 54 may include a Hall sensor to detect the insertion of the infrared filter into the optical path depending on whether the magnet provided in the filter insertion-removal unit 53 is detected.

For example, when the microscope system 1 performs observation using visible light, the digital camera 50 is configured such that the filter insertion-removal unit 53 inserts the infrared cut filter into the optical path to improve color reproducibility. For example, when the microscope system 1 performs observation using near infrared light, the digital camera 50 is configured such that the filter insertion-removal unit 53 removes the infrared cut filter from the optical path to improve sensitivity.

The digital camera 50 outputs the detection result of the filter detection unit 54 to the control device 30. The scene recognition unit 31 of the control device 30 is configured to switch the machine learning model used for the scene recognition based on the detection result of the filter detection unit 54. Specifically, when the filter detection unit 54 detects that the infrared cut filter is inserted into the optical path, the scene recognition unit 31 performs the scene recognition using a machine learning model that learns scenes through images acquired using the infrared cut filter. On the other hand, when the filter detection unit 54 detects that the infrared cut filter is not inserted into the optical path, the scene recognition unit 31 performs the scene recognition using a machine learning model that learns scenes through images acquired without using the infrared cut filter.

With the microscope system 2 according to the present embodiment, the same effect as that of the microscope system 1 according to the first embodiment can also be obtained. Further, in the microscope system according to the present embodiment, the machine learning model is selectively used depending on the insertion-removal state of the infrared cut filter. Therefore, the scene determination can be performed with higher accuracy.

Eighth Embodiment

Figure 13:
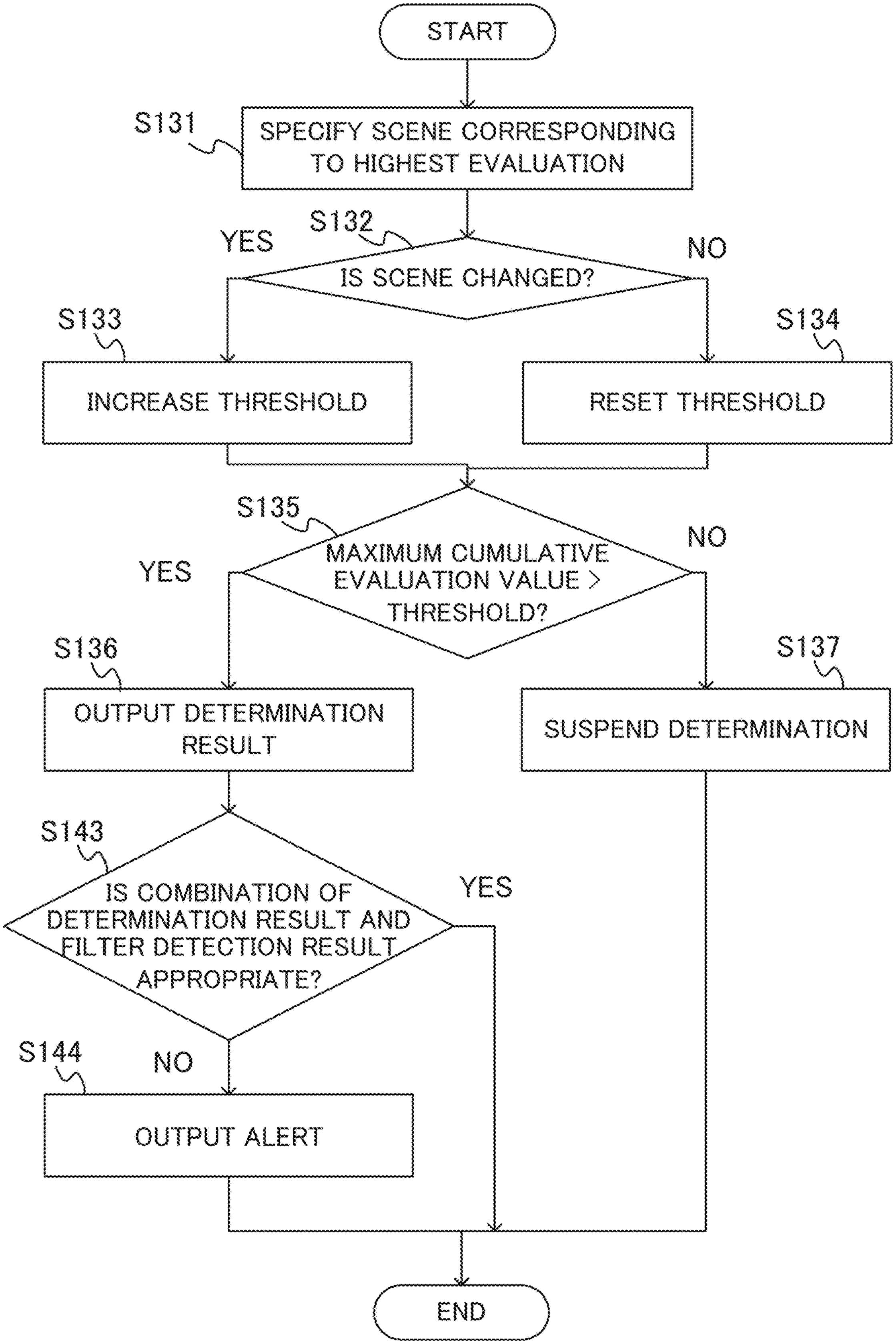
FIG. 13 is a diagram illustrating an example of a flowchart of a determination process that is performed by a control device according to an eighth embodiment of the present invention.

FIG. 13 is a diagram illustrating an example of a flowchart of a determination process that is performed by the control device according to the present embodiment. A configuration of the microscope system according to the present embodiment is the same as that of the microscope system 2 according to the seventh embodiment. The automatic setting process that is performed by the control device 30 according to the present embodiment is different from the automatic setting process that is performed by the control device 30 according to the seventh embodiment, in that it includes the determination process illustrated in FIG. 13 instead of the determination process illustrated in FIG. 6.

The determination process illustrated in FIG. 13 includes the processes of Step S143 and Step S144 in addition to the processes of Step S131 to Step S137 corresponding to the processes of Step S31 to Step S37 configuring the determination process illustrated in FIG. 6. In the determination process illustrated in FIG. 13, when the determination result is output in Step S136, the control device 30 determines whether a combination of the output determination result and the filter detection result of the filter detection unit 54 is appropriate (Step S143).

In the control device 30, combinations of the insertion-removal state of the infrared cut filter that may be used for observation and the scenes are registered in advance. In Step S143, the control device 30 determines whether the combination of the output determination result and the filter detection result of the filter detection unit 54 is appropriate depending on whether this combination is included in the combinations that are registered in advance. Examples of the combinations that are registered are not particularly limited. For example, both of the insertion state and the removal state may be registered for fluorescent observation, phase difference observation, differential interference observation, and polarization observation, and only the insertion state may be registered for bright field observation.

Next, when the control device 30 determines that the combination is appropriate (Step S143, YES), the control device 30 ends the determination process illustrated in FIG. 13. On the other hand, when the control device 30 determines that the combination is not appropriate (Step S143, NO), the control device 30 causes a notification unit to output an alert (Step S144). As a result, the notification unit notifies a user that the insertion-removal state of the infrared cut filter is not appropriate for the scene. The notification unit may be, for example, a display device of the control device 30, or the control device 30 may display an alert (for example, a message "the infrared cut filter is not inserted. Please insert the infrared cut filter in bright field observation") on a live image displayed on the display device. That is, the microscope system 2 according to the present embodiment includes the notification unit that outputs the alert based on the determination result of the scene determination unit 32 and the detection result of the filter detection unit 54.

With the microscope system according to the present embodiment, the same effect as that of the microscope system 1 according to the first embodiment can also be obtained. Further, in the microscope system according to the present embodiment, the circumstances where the combination of the insertion-removal state of the infrared cut filter and the scene is not appropriate can be notified to the user. As a result, by urging the user to insert or remove the infrared cut filter, the use of the microscope system with inappropriate settings can be avoided.

Ninth Embodiment

Figure 14:
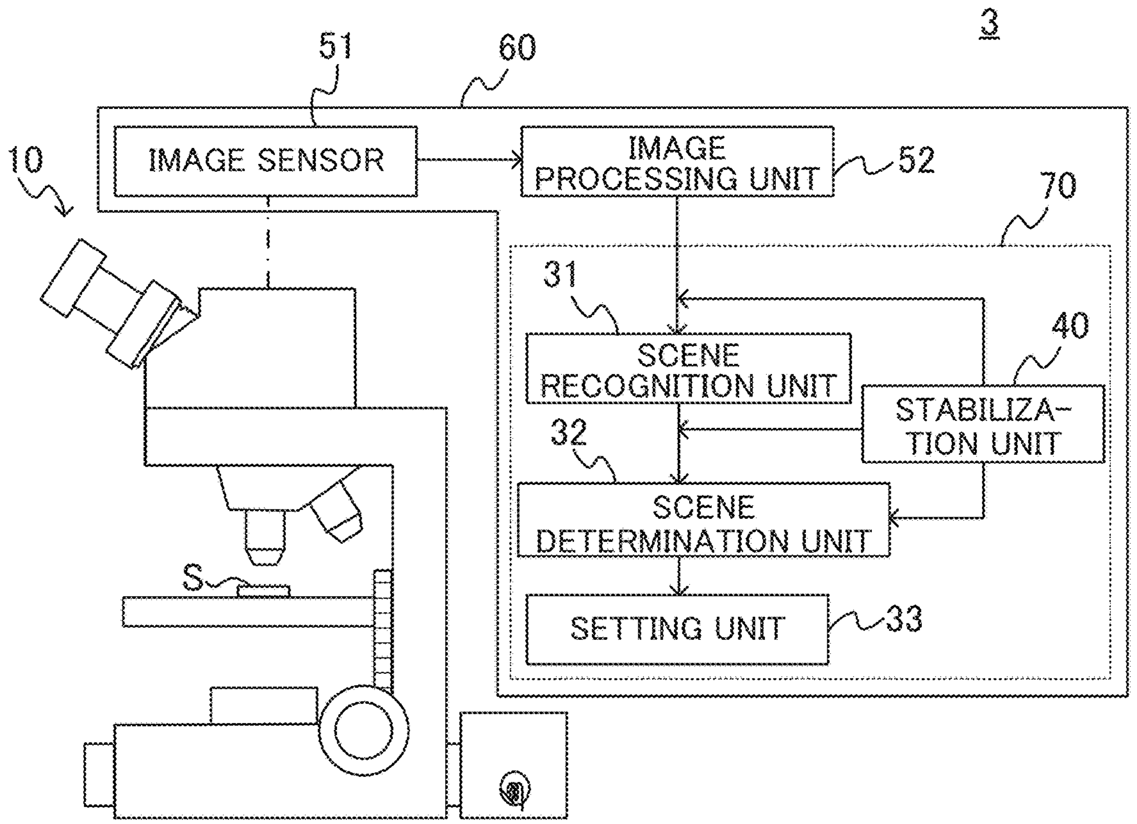
FIG. 14 is a diagram illustrating a configuration of a microscope system according to a ninth embodiment of the present invention.

FIG. 14 is a diagram illustrating a configuration of a microscope system according to the present embodiment. A microscope system 3 illustrated in FIG. 14 is different from the microscope system 1 in that it includes a digital camera 60 instead of the digital camera 20 and the control device 30. The other points are similar to those of the microscope system 1.

The digital camera 60 includes a control unit 70 that performs the scene recognition, the stabilization process, the scene determination, and the setting change in addition to the image sensor 51 and the image processing unit 52. That is, as in the control device 30 of the microscope system 1, the digital camera 60 has the functions (the scene recognition unit 31, the scene determination unit 32, the setting unit 33, the stabilization unit 40) of automating the setting change corresponding to the scene.

With the microscope system 3 according to the present embodiment, the same effect as that of the microscope system 1 according to the first embodiment can also be obtained.

Figure 15:
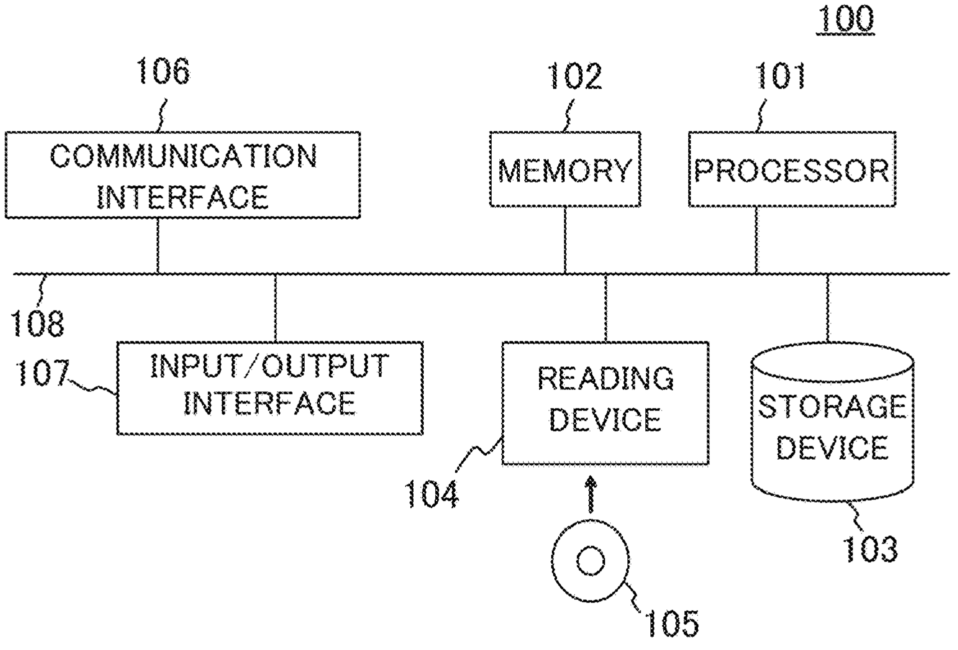
FIG. 15 is a diagram illustrating a hardware configuration of a computer for implementing the control device.

FIG. 15 is a diagram illustrating a hardware configuration of a computer 100 for implementing the control device or the control unit according to the embodiment. The hardware configuration illustrated in FIG. 15 includes, for example, a processor 101, a memory 102, a storage device 103, a reading device 104, a communication interface 106, and an input/output interface 107. Note that the processor 101, the memory 102, the storage device 103, the reading device 104, the communication interface 106, and the input/output interface 107 are connected to one another, for example, via a bus 108.

The processor 101 is any processor and may include, for example, a Central Processing Unit (CPU), a Field Programmable Gate Array (FPGA), an Application Specific Integrated Circuit (ASIC), or a General-purpose computing on graphics processing units (GPGPU).

The processor 101 may read and execute a program stored in storage device 103 to function as the scene recognition unit 31, the scene determination unit 32, the setting unit 33, and the stabilization unit 40. For example, the scene recognition unit 31 may be configured using a GPGPU, an ASIC or the like, or the scene determination unit 32, the setting unit 33, and the stabilization unit 40 may be configured using a CPU or an FPGA.

For example, the memory 102 is a semiconductor memory, and may include a RAM area and a ROM area. For example, the storage device 103 is a hard disk, a semiconductor memory such as a flash memory, or an external storage device.

For example, the reading device 104 accesses a removable storage medium 105 in accordance with an instruction of the processor 101. For example, the removable storage medium 105 is achieved by a semiconductor device, a medium to/from which information is input/output by a magnetic action, a medium to/from which information is input/output by an optical action. Note that, for example, the semiconductor device is a universal serial bus (USB) memory. Such a medium to and from which information is input and output by a magnetic effect is, for example, a magnetic disk. Such a medium to and from which information is input and output by an optical effect is, for example, a compact disc (CD)-ROM, a digital versatile disk (DVD), or a Blu-ray disc (Blu-ray is a registered trademark).

The communication interface 106 communicates with other devices (for example, the microscope 10, the digital camera 20, and the like) according to an instruction of the processor 101, for example. The input/output interface 107 is an interface, for example, between an input device and an output device. The input device is, for example, a device such as a mouse, a keyboard, or a foot switch that receives an instruction from the user. For example, the output device is a display device and an audio device such as a speaker.

For example, the program executed by the processor 101 is provided to the computer in the following forms:

(1) Installed in the storage device 103 in advance (2) Provided by the removable storage medium 105

(3) Provided from a server such as a program server.

Note that the hardware configuration of the computer for implementing the control device, described with reference to FIG. 15, is exemplary and thus the embodiment is not limited thereto.

The above-described embodiments are specific examples to facilitate an understanding of the invention, and hence the present invention is not limited to such embodiments. Modifications obtained by modifying the above-described embodiments and alternatives to the above-described embodiments may also be included. In other words, the components of each embodiment can be modified without departing from the spirit and scope of the embodiment. In addition, new embodiments can be implemented by appropriately combining a plurality of components disclosed in one or more of the embodiments. Furthermore, some components may be omitted from the constituent elements in each of the embodiments, or some constituent elements may be added to the constituent elements in each of the embodiments. Moreover, the order of the processing described in each of the embodiments may be changed as long as there is no contradiction.

What is claimed is:

1. A microscope system comprising:

a microscope;

a digital camera configured to image an object through the microscope; and a processor, wherein the processor is configured to:

perform scene recognition based on an image of the object obtained by the digital camera, using a machine learning model that has learned a plurality of scenes;

calculate, as postprocessing on a result of the scene recognition, a cumulative recognition result that is an accumulated recognition result in a period corresponding to a plurality of frames based on a plurality of results of the scene recognition corresponding to the plurality of frames;

perform scene determination based on the cumulative recognition result;

temporally stabilize a result of the scene determination; and change settings of the digital camera based on the result of the scene determination.

2. The microscope system according to claim 1, wherein the processor is configured to:

perform, as preprocessing on the image of the object, inverse transformation of image processing performed in the digital camera on the image of the object, and perform the scene recognition based on an inverse-transformed image obtained by the inverse transformation.

3. The microscope system according to claim 1, wherein when an evaluation value of a scene corresponding to a highest evaluation in the cumulative recognition result does not exceed a threshold, the processor is configured to suspend the scene determination.

4. The microscope system according to claim 3, wherein when the evaluation value of the scene corresponding to the highest evaluation exceeds the threshold, the processor is configured to output the scene corresponding to the evaluation value as the determination result.

5. The microscope system according to claim 3, wherein:

when the evaluation value of the scene corresponding to the highest evaluation exceeds the threshold and the scene corresponding to the evaluation value is not a background, the processor is configured to output the scene corresponding to the evaluation value as the determination result, and when the evaluation value of the scene corresponding to the highest evaluation exceeds the threshold and the scene corresponding to the evaluation value is a background, the processor is configured to suspend the scene determination.

6. The microscope system according to claim 3, wherein when the evaluation value of the scene corresponding to the highest evaluation exceeds the threshold, the processor is configured to determine whether to suspend the scene determination or to output the scene corresponding to the evaluation value as the determination result based on the scene corresponding to the evaluation value and time-series data of a determination result that is just output.

7. The microscope system according to claim 3, wherein when the evaluation value of the scene corresponding to the highest evaluation exceeds the threshold, the processor is configured to perform the scene determination based on the scene corresponding to the evaluation value and time-series data of a determination result that is already output and to output a determined scene as the determination result.

8. The microscope system according to claim 3, wherein;

when the scene corresponding to the highest evaluation in the cumulative recognition result is different from a scene corresponding to the determination result that is just output, the processor is configured to increase the threshold, and when the scene corresponding to the highest evaluation in the cumulative recognition result is the same as a scene corresponding to the determination result that is just output, the processor is configured to reset the threshold to an initial value.

9. The microscope system according to claim 8, wherein when movement of the object is detected, the processor is configured to reset the threshold to the initial value.

10. The microscope system according to claim 1, wherein:

the processor is configured to set, as a dead band, a predetermined number of frame periods from a timing at which the settings are changed or from a timing at which the settings are scheduled to be changed, and the processor is configured not to reflect results of the scene recognition corresponding to frames in the dead band on the cumulative recognition result.

11. The microscope system according to claim 1, wherein;

the processor includes a restriction setting for restricting a change in the settings of the digital camera, and when the restriction setting is enabled, the processor is configured to change the settings of the digital camera based on the result of the scene determination and to subsequently prohibit the settings from being changed.

12. The microscope system according to claim 1, wherein the processor is further configured to change settings of the microscope based on the result of the scene determination.

13. The microscope system according to claim 1, wherein:

the digital camera further includes:

a filter insertion-removal unit configured to insert or remove an infrared cut filter into or from an optical path; and a sensor configured to detect whether the infrared cut filter is inserted into the optical path, and the processor is configured to switch the machine learning model used for the scene recognition based on a detection result of the sensor.

14. The microscope system according to claim 13, further comprising a display device configured to output an alert based on the result of the scene determination and the detection result of the sensor.

15. A setting changing method causing a computer to execute processes comprising:

performing scene recognition based on an image of an object obtained by a digital camera configured to image the object through a microscope, using a machine learning model that has learned a plurality of scenes;

calculating, as postprocessing on a result of the scene recognition, a cumulative recognition result that is an accumulated recognition result in a period corresponding to a plurality of frames based on a plurality of results of the scene recognition corresponding to the plurality of frames;

performing scene determination based on the cumulative recognition result;

temporally stabilizing a result of the scene determination; and changing settings of the digital camera based on the result of the scene determination.

16. A non-transitory computer-readable storage medium that stores a program thereon, the program being executable to control a computer to execute processes comprising:

performing scene recognition based on an image of an object obtained by a digital camera configured to image the object through a microscope, using a machine learning model that has learned a plurality of scenes;

calculating, as postprocessing on a result of the scene recognition, a cumulative recognition result that is an accumulated recognition result in a period corresponding to a plurality of frames based on a plurality of results of the scene recognition corresponding to the plurality of frames;

performing scene determination based on the cumulative recognition result;

temporally stabilizing a result of the scene determination; and changing settings of the digital camera based on the result of the scene determination.

17. A digital camera comprising:

an image sensor configured to image an object through a microscope; and a processor, wherein the processor is configured to:

perform scene recognition based on an image of the object generated by processing an output from the image sensor, using a machine learning model that has learned a plurality of scenes;

calculate, as postprocessing on a result of the scene recognition, a cumulative recognition result that is an accumulated recognition result in a period corresponding to a plurality of frames based on a plurality of results of the scene recognition corresponding to the plurality of frames;

perform scene determination based on the cumulative recognition result;

temporally stabilize a result of the scene determination; and change settings of the digital camera based on the result of the scene determination.

* * * * *